US012556750B2

(12) United States Patent
Zilberstein et al.

(10) Patent No.: US 12,556,750 B2
(45) Date of Patent: Feb. 17, 2026

(54) VIDEO CLUSTERING AND ANALYSIS BASED ON CONCEPT PROMINENCE

(71) Applicant: Google LLC, Mountain View, CA (US)

(72) Inventors: Tzahi Zilberstein, Hod Hasharon (IL); Andrei Vladimirovich Markin, Kuznetzk (RU)

(73) Assignee: Google LLC, Mountain View, CA (US)

( * ) Notice: Subject to any disclaimer, the term of this patent is extended or adjusted under 35 U.S.C. 154(b) by 275 days.

(21) Appl. No.: 18/033,690

(22) PCT Filed: Oct. 7, 2022

(86) PCT No.: PCT/US2022/046006
§ 371 (c)(1),
(2) Date: Apr. 25, 2023

(87) PCT Pub. No.: WO2023/080990
PCT Pub. Date: May 11, 2023

(65) Prior Publication Data
US 2024/0388743 A1    Nov. 21, 2024

(30) Foreign Application Priority Data
Nov. 5, 2021   (IL) .......................... 287859

(51) Int. Cl.
*H04N 21/23*     (2011.01)
*G06V 10/762*    (2022.01)
(Continued)

(52) U.S. Cl.
CPC ................. *H04N 21/23418* (2013.01); *G06V 10/7635* (2022.01); *G06V 20/41* (2022.01)

(58) Field of Classification Search
CPC .......... H04N 21/23418; H04N 21/274; G06V 10/7635; G06V 20/41; G06F 16/75; G06F 16/9024
(Continued)

(56) References Cited

U.S. PATENT DOCUMENTS 9,147,194 B1    9/2015 Le et al.
2007/0027761 A1    2/2007 Collins et al.
(Continued)

FOREIGN PATENT DOCUMENTS

CN    103678569    3/2014

OTHER PUBLICATIONS

Office Action in Israel Appln. No. 287859, mailed on Jan. 3, 2024, 3 pages.
(Continued)

*Primary Examiner* — Neil R Mclean
(74) *Attorney, Agent, or Firm* — Fish & Richardson P.C.

(57) ABSTRACT

Methods, systems, and apparatus, including computer programs encoded on a computer storage medium, for improving content analysis. A method includes obtaining videos uploaded by video publishers. A concept index is generated for each given video. The concept index is generated based on at least (i) a concept conveyed by one or more objects depicted in the video, and (ii) a level of prominence of the concept in the given video. Based on the concept indices of the videos, multiple video groups are created. Each given video group includes two or more different videos that each have a specified level of similarity to other videos in the given video group. Based on data obtained through a feedback loop, insights about the multiple video groups are generated. Distribution of at least one video is modified based on the insights about the given video group that includes the at least one video.

20 Claims, 5 Drawing Sheets

(51) Int. Cl.
  *G06V 20/40* (2022.01)
  *H04N 21/234* (2011.01)
(58) Field of Classification Search
  USPC .......................................................... 382/225
  See application file for complete search history.

(56) References Cited

U.S. PATENT DOCUMENTS

| | | | |
|---|---|---|---|
| 2014/0222831 | A1 | 8/2014 | Ramkumar et al. |
| 2015/0269231 | A1 | 9/2015 | Huynh et al. |
| 2017/0185838 | A1 | 6/2017 | Johri et al. |
| 2018/0101540 | A1* | 4/2018 | Stoop .................. G06F 16/7867 |
| 2018/0293313 | A1* | 10/2018 | Hauptmann ........ G06F 16/7837 |
| 2018/0373778 | A1 | 12/2018 | Kalmes et al. |
| 2019/0043073 | A1 | 2/2019 | Peysakhovich et al. |
| 2019/0258671 | A1 | 8/2019 | Bou et al. |
| 2021/0058667 | A1* | 2/2021 | He .................. H04N 21/23418 |
| 2021/0150224 | A1 | 5/2021 | Miao et al. |
| 2021/0248375 | A1* | 8/2021 | Geng .................. G06F 16/9035 |

OTHER PUBLICATIONS

International Preliminary Report on Patentability in International Appln. No. PCT/US2022/046006, mailed on May 16, 2024, 8 pages.

Office Action in Japanese Appln. No. 2023-524774, mailed on Jul. 8, 2024, 6 pages (with English translation).

Notice of Allowance in Japanese Appln. No. 2023-524774, mailed on Dec. 16, 2024, 5 pages (with English translation).

Docs.getsocial.im [online], "Analyze Social Behaviour on GetSocial Dashboard" 2021, retrieved on Oct. 12, 2022, retrieved from URL <https://docs.getsocial.im/guides/dashboard/analytics/#analyze-social-behaviour-on-getsocial-dashboard>, 27 pages.

International Search Report and Written Opinion in International Appln. No. PCT/US2022/046006, mailed on Jan. 27, 2023, 14 pages.

Singular.net [online], "Homepage Video" May 2020, retrieved on Oct. 12, 2022, retrieved from URL <https://www.singular.net/wp-content/uploads/2020/05/Homepage-Video-V2R2-200420.mp4>, 1 page.

Office Action in Canada Appln. No. 3,196,587, mailed on Sep. 9, 2024, 10 pages.

Office Action in European Appln. No. 22800920.5, mailed on Aug. 28, 2024, 7 pages.

Office Action in Indian Appln. No. 202327053457, mailed on Jul. 15, 2025, 7 pages (with English translation).

Office Action in Korean Appln. No. 10-2023-7012230, mailed on Jun. 16, 2025, 16 pages (with English translation).

Yadav et al., "Knowledge Graph Driven Approach to Represent Video Streams for Spatiotemporal Event Pattern Matching in Complex Event Processing." cs.CV, Submitted on Jul. 2020, arXiv:2007.06292v1, 32 pages.

Hu et al., "A survey on visual content-based video indexing and retrieval." IEEE Transactions on Systems, Man, and Cybernetics, Part C (Applications and Reviews) 41.6, Mar. 2011, 797-819.

Liu et al., "Association and temporal rule mining for post-filtering of semantic concept detection in video." IEEE Transactions on Multimedia 10.2, Jan. 2008, 11 pages.

Office Action in Canada Appln. No. 3,196,587, mailed on Jul. 10, 2025, 7 pages.

Office Action in Chinese Appln. No. 202280007124.5, mailed on Dec. 2, 2025, 35 pages (with English translation).

\* cited by examiner

VIDEO CLUSTERING AND ANALYSIS BASED ON CONCEPT PROMINENCE

CROSS-REFERENCE TO RELATED APPLICATIONS

This application is a National Stage Application under 35 U.S.C. § 371 and claims the benefit of International Application No. PCT/US2022/046006, filed Oct. 7, 2022, which claims priority to Israeli Application Serial No. 287859, filed Nov. 5, 2021, the entirety of which is incorporated herein by reference.

BACKGROUND

This specification relates to data processing and analysis of videos. The amount of online videos has grown over the year, and anyone with a computer can now upload video content. Identifying groups of similar videos to analyze is difficult because of the different ways in which video can be used to convey similar concepts.

SUMMARY

In general, one innovative aspect of the subject matter described in this specification can be embodied in methods that include the actions of obtaining, by a service apparatus, videos uploaded by video publishers; generating, by the service apparatus, a concept index for each given video, wherein the concept index is generated based on at least (i) a concept conveyed by one or more objects depicted in the video, and (ii) a level of prominence of the concept in the given video; creating, by the service apparatus and based on the concept indices of the videos, multiple video groups, wherein each given video group among the multiple video groups is created to include two or more different videos that each have a specified level of similarity to other videos in the given video group; generating, by the service apparatus and based on data obtained through a feedback loop, insights about the multiple video groups; and modifying, by the service apparatus, a manner by which at least one video is distributed over a network based on the insights about the given video group that includes the at least one video.

Other embodiments of this aspect include corresponding systems, apparatus, and computer programs, configured to perform the actions of the methods, encoded on computer storage devices.

These and other embodiments can each optionally include one or more of the following features. Generating the concept index for each given video can include for each given video among the videos: obtaining one or more knowledge graphs for multiple portions of the given video, wherein each of the knowledge graphs represents one or more concepts conveyed by the given video; and determining, for each given knowledge graph, a presence share indicative of the level of prominence of the concept represented by the given knowledge graph, wherein the concept index is generated, at least in part, based on a number of instances of the given knowledge graph in the given video and a total presence share of the given knowledge graph over a length of the video.

Generating the concept index for each given video can include for each given knowledge graph obtained for the given video: summing the presence shares of the given knowledge graph over the length of the given video; determining a number of portions of the given video are described by the given knowledge graph; and generating the concept index for the given video based on a ratio of the summed presence shares relative to the number of portions.

Methods can include, for each given knowledge graph obtained for multiple videos uploaded by the video publishers: generating an inverse document frequency measure for the given knowledge graph based on a total number of the multiple videos that are represented by the given knowledge graph; and applying the generated inverse document frequency to a total presence share of the given knowledge graph for each of the multiple videos.

Methods can include selecting a pair of videos from among the multiple videos; generating a count of shared knowledge graphs between the pair of videos, wherein each shared knowledge graph is a given knowledge graph that is among the knowledge graphs that represent each video in the pair of videos; for each particular shared knowledge graph between the pair of videos: deriving a shared similarity score of the particular shared knowledge graph based on a minimum presence share of the knowledge graph for either video among the pair of videos; and deriving a possible similarity score of the particular shared knowledge graph based on a maximum presence share of the knowledge graph for either video among the pair of videos.

Methods can include generating a dissimilarity count based on a number of the dissimilar knowledge graphs that represent only one of the videos in the pair of videos; calculating a dissimilarity score for the pair of videos based on the concept indices of the dissimilar knowledge graphs of each video in the pair of videos; and generating one or more clustering factors for the pair of videos based on the dissimilarity score, the possible similarity score, and the shared similarity score.

Creating the multiple groups of videos can include for each pair of videos, comparing the clustering factors for the pair of videos to the specified level of similarity; including, in a same group, a first pair of videos for which the clustering factors meet the specified level; and excluding, from the same group a third video for which the clustering factors relative to the first pair of videos does not meet the specified level.

Particular embodiments of the subject matter described in this specification can be implemented so as to realize one or more of the following advantages. Unlike traditional similarity techniques, the techniques discussed herein enable computers to take substantially different videos, determine the conceptual similarity between these different videos, and cluster these different videos together for purposes of improving the ability of the computer to evaluate groups of videos together. This leads to a more efficient analysis system because instead of having to evaluate every video in a cluster (also referred to as a group), a subset of representative videos and/or aggregate information for a cluster can be evaluated at run time, enabling the computer to provide a real time response to inquiries, which could not be achieved if all of the videos needed to be evaluated to provide responses to the inquiries. Furthermore, the techniques discussed herein prevent errors in similarity determinations that occur using traditional similarity techniques when two videos may have very few (e.g., 1 or two) common features, but the similarity distance between those features is very small. In these situations, the similarity of the small number of common features can outweigh all of the dissimilarities between the videos, thereby resulting in an erroneous determination of video similarity.

The techniques discussed herein also reduce the amount of time required for a computer to learn a distribution strategy for videos (or other content). Traditional computer systems require a fairly lengthy learning period to determine the situations in which delivery of content to a client device will be an efficient use of the server-side resources (e.g., network bandwidth, server cores, etc.) required to deliver the content, and/or an efficient use of the client-side resources (e.g., battery consumption, processor cycles, data plan usage, etc.) required to present the content. This learning period can be a week or longer, and during this learning period, the delivery of the content is often leading to wasted server-side resources (e.g., server core usage) and wasted client side resources (e.g., battery drain) while the computer system learns the difference between good times to deliver the content and bad times to deliver the content. However, using the techniques described herein, the learning period can be dramatically reduced, if not eliminated, thereby enabling the computer system to more effectively utilize both the server-side resources and the client-side resources relative to using the traditional learning period approach. This improvement in resource utilization is achieved by initially determining the cluster to which a new video (or other content) belongs, and leveraging the aggregate information from the videos in the cluster to initialize the delivery of the new video without requiring the long learning phase.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
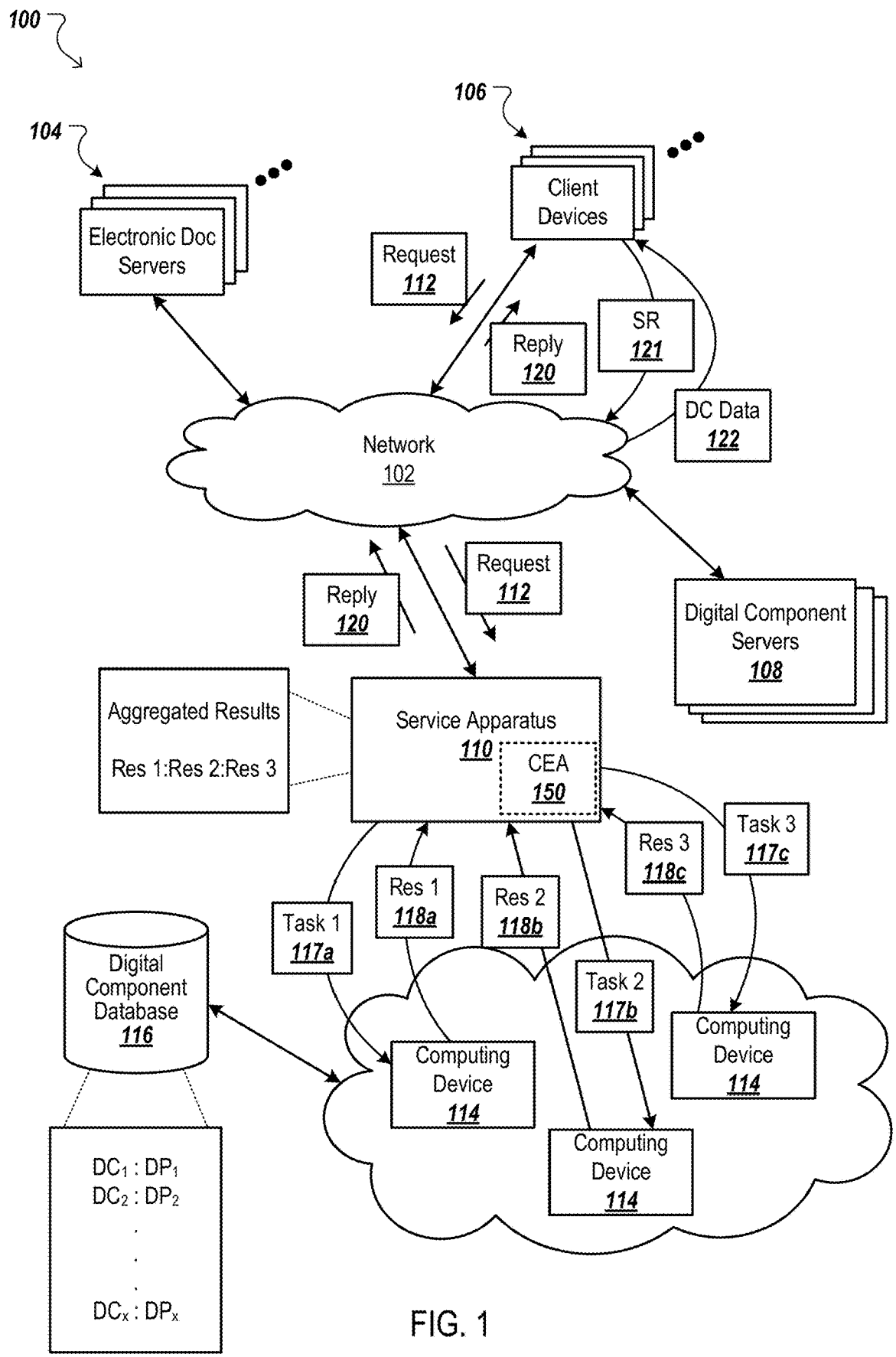
FIG. 1 is a block diagram of an example online environment.

This specification describes techniques for clustering videos based on an overall concept conveyed by different multimedia content (e.g., combinations of images, video, and/or audio) despite differences between the different multimedia content that would otherwise prevent the different multimedia content from being identified as similar. Using online videos as an example, the resolution, coloring, spoken language, order of elements, and other aspects of two videos can vary dramatically, but these two videos may still convey similar concepts, such that these two videos should be clustered together for analysis of videos that convey a same/similar concept. However, using traditional techniques, it is likely that these two videos would not be clustered together for purposes of analysis because traditionally computers have not been capable of determining concept similarity in videos (or other multimedia content) when the individual videos (or other multimedia content) differ in their presentation attributes and/or the ways in which concepts are conveyed by different video (or other multimedia) presentations.

Unlike traditional similarity techniques, the techniques discussed herein enable computers to take substantially different videos, determine the conceptual similarity between these different videos, and cluster these different videos together for purposes of improving the ability of the computer to evaluate groups of videos together. As discussed throughout this specification, the evaluation of the groups of videos can be used to provide insights as to concepts for which new videos should be developed, determine representative videos and/or aggregate information for each cluster (e.g., concept group), which can be used to reduce subsequent processing of videos in the group, and accelerate the optimization of content distribution rules to effectively utilize server-side and client-side computing resources.

As discussed in more detail, the techniques generally involve extracting concept information from videos (or other content), and clustering the videos based on concept similarity irrespective of how the concept information is conveyed (e.g., by different people, in different languages, or in a different order). Once the videos are clustered according to concept, the videos can be analyzed on a per-concept basis to provide insights about different concepts. A visual mapping of the videos can also be created to visually convey information about closely related concepts and closely related video groups. The visual mapping can be decluttered, thereby improving the usefulness of the map in a limited display area, by selecting a representative video for each video group and deduplicating videos that are substantially the same, except for differences in resolution, color scaling, compression techniques, etc. The representative video can be selected in a variety of ways (e.g., similarity to other videos, feedback data, etc). The visualization of the video mapping can be output to the user, and the mapping can include interactive features that enable a user to obtain information about each video group through interaction with the mapping. For example, a user can click on a representative image of a video group, and be provided information about the videos in that group. Similarly, the user can interact with the mapping (e.g., zoom in/zoom out) to drill into a video group, which may reveal additional subgroups of videos, or to review information for a broader grouping level.

Throughout this specification, videos are used as an example of multimedia content to which the techniques discussed can be applied to provide more specific examples and a specific use case. However, the techniques discussed herein can be applied to any form of content, such that the use of videos for purposes of example should not be considered limiting. In other words, the word video(s) could generally be replaced with the word content(s) throughout the specification.

FIG. 1 is a block diagram of an example online environment 100. The example environment 100 includes a network 102, such as a local area network (LAN), a wide area network (WAN), the Internet, or a combination thereof. The network 102 connects electronic document servers 104, user devices 106, digital component servers 108, and a service apparatus 110. The example environment 100 may include many different electronic document servers 104, user devices 106, digital component servers 108, and service apparatus 110.

A client device 106 is an electronic device that is capable of requesting and receiving resources over the network 102. Example client devices 106 include personal computers, mobile communication devices, digital assistant devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

Digital assistant devices include devices that have a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 106 by electronic document servers 104 ("Electronic Doc Servers"). For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include video servers from which client devices 106 can download videos (e.g., user created videos or other videos). In this example, the client device 106 can download files required to play the video in a web browser or a native application configured to play a video.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a script that causes the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include a digital component script that references the service apparatus 110, or a particular service provided by the service apparatus 110. In these situations, the digital component script is executed by the client device 106 when the given electronic document is processed by the client device 106. Execution of the digital component script configures the client device 106 to generate a request for digital components 112 (referred to as a "component request"), which is transmitted over the network 102 to the digital component distribution system 110. For example, the digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the service apparatus 110 can use to select one or more digital components, or other content, provided in response to the request. The component request 112 is transmitted, by the client device 106, over the network 102 (e.g., a telecommunications network) to a server of the service apparatus 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations (e.g., portions of a page or durations within a video), and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the service apparatus 110 to facilitate identification of digital components that are eligible for presentation with the electronic document. The event data can also include a search query that was submitted from the client device 106 to obtain a search results page (e.g., that presents general search results or video search results).

Component requests 112 can also include event data related to other information, such as information that a user of the client device has provided, geographic information indicating a state or region from which the component request was submitted, a language setting of the client device, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The service apparatus 110 chooses digital components (e.g., video files, audio files, images, text, and combinations thereof, which can all take the form of advertising content or non-advertising content) that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the service apparatus 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components (DC1-x). The millions of available digital components can be indexed, for example, in a digital component database 116. Each digital component index entry can reference the corresponding digital component and/or include distribution parameters (DP1-DPx) that contribute to (e.g., trigger, condition, or limit) the distribution/transmission of the corresponding digital component. For example, the distribution parameters can contribute to (e.g., trigger) the transmission of a digital component by requiring that a component request include at least one criterion that matches (e.g., either exactly or with some pre-specified level of similarity) one of the distribution parameters of the digital component.

The identification of the eligible digital component can be segmented into multiple tasks 117a-117c that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital components that are eligible for distribution in response to the component request and/or a subset of the digital component that have certain distribution parameters. The identification of the subset of digital components can include, for example, comparing the event data to the distribution parameters, and identifying the subset of digital components having distribution parameters that match at least some features of the event data.

The service apparatus 110 aggregates the results 118a-118c received from the set of multiple computing devices 114 and uses information associated with the aggregated results to select one or more digital components that will be provided in response to the request 112. For example, the service apparatus 110 can select a set of highest ranking digital components (one or more digital components) based on the outcome of one or more content evaluation processes. In turn, the service apparatus 110 can generate and transmit, over the network 102, reply data 120 (e.g., digital data representing a reply) that enable the client device 106 to integrate the set of highest ranking digital components into the given electronic document, such that the set of highest ranking digital components and the content of the electronic document are presented together at a display of the client device 106.

In some implementations, the client device 106 executes instructions included in the reply data 120, which configures and enables the client device 106 to obtain the set of highest ranking digital component from one or more digital component servers. For example, the instructions in the reply data 120 can include a network location (e.g., a Uniform Resource Locator (URL)) and a script that causes the client device 106 to transmit a server request (SR) 121 to the digital component server 108 to obtain a given highest ranking digital component from the digital component server 108. In response to the request, the digital component server 108 will identify the given highest ranking digital component specified in the server request 121 (e.g., within a database storing multiple digital components) and transmit, to the client device 106, digital component data (DC Data) 122 that presents the given highest ranking digital component in the electronic document at the client device 106.

The service apparatus 110 can utilize various techniques to evaluate the eligibility of various different digital components that are available to be transmitted in response to a given component request (e.g., an individual component request). For example, the service apparatus 110 can compare eligibility scores of the various different digital components and select one or more of the digital components having the highest eligibility scores as the digital components that will be transmitted to the client device 106 in response to the given component request. In some situations, an initial eligibility score can be determined based on one or more factors. For example, one provider (P1) of a video clip (VC1) can provide distribution criterion X for VC1, and a different provider (P2) of a different video clip (VC2) can provide a different distribution criterion Y. For purposes of this example, assume that the component request is only requesting one digital component to be presented with a particular web page or with a particular video. To select which of the two video clips will be provided, the service apparatus 110 can rank VC1 and VC2 based on their respective eligibility scores, which can be determined based on a comparison of the distribution criteria provided by P1 and P2 to information included in the request 112. In some implementations, the set of distribution criteria that is most similar to the information in the request 112 will have the highest eligibility score, and therefore be ranked highest. The service apparatus 110 can select the highest ranked video clip to be transmitted to the client device in response to the component request 112.

In some situations, the eligibility scores are augmented (or varied) based on one or more other factors. For example, the service apparatus 110 can generate an adjusted eligibility score for a digital component based on the initial eligibility score of that digital component and a quality factor for the digital component.

The quality factor for a given digital component can quantify the likelihood that the given digital component is an appropriate digital component to be provided in response to a given component request. In some implementations, the quality factor is determined based on one or more features specified by the event data. More specifically, the service apparatus 110 can input one or more features from the event data (e.g., geographic information and/or terms from the electronic document) into a machine learning system that outputs a predicted distribution outcome, which can be used as the quality factor. The predicted distribution outcome can be expressed, for example, as a predicted interaction rate (e.g., click-through-rate, play-through-rate, or another measure of interaction with a digital component) for the digital component in the context of the present component request.

Once the quality factor has been obtained, it can be applied to the initial eligibility score to arrive at an adjusted eligibility score. For example, the adjusted eligibility score (AES) can be a product of the initial eligibility score and the quality factor (e.g., AES=quality factor*initial eligibility score). In some situations, the adjusted eligibility scores of the various different digital components can be used to rank the digital components (e.g., from highest to lowest), and one or more of the highest ranking digital components can be selecting to be transmitted in response to the component request.

The effectiveness of distributed content (e.g., videos), which can also serve as a proxy for whether the use of server-side and/or client-side computing resources is justified, can be evaluated based on user responses to content that is delivered to client devices. While tracking user responses for individual portions of content (e.g., individual videos) can provide insight as to which portions of content result in an effective use of the computing resources required to deliver the content, such evaluation does not provide insight as to why certain portions of content are better for distribution (e.g., better utilize the limited server-side and/or client-side computer resources and/or elicit a more positive user response). To provide this type of deeper insight as to why certain portions of content are better for distribution, an aggregate analysis of multiple similar portions of content needs to be performed, such that the portions of content need to be grouped together in a meaningful way.

One way of grouping portions of content is by their conceptual similarity. As used through this document, conceptual similarity refers to a similarity between concepts conveyed by two or more portions of content. As described in more detail below, the conceptual similarity between two portions of content can be determined based on a level of match between the concepts conveyed by the two portions of content, which can be determined irrespective of the way in which those concepts are conveyed.

For example, assume that video 1 (V1) is a 30-second animated video that depicts a cat chasing a mouse for 25 seconds of the video, and presents the text "Call Exterminator X at 555-555-5555" for the remaining 5 seconds of the video. Also assume that video 2 (V2) is a 30-second live video that does not include any presented text, but depicts a cat chasing a mouse, and the mouse jumping to safety. In this example, the two videos may be deemed very similar to the concept of a cat chasing a mouse based on the fact that the majority of each video depicts a cat chasing a mouse, even though there are significant differences in how this concept is conveyed (e.g., animated vs. live). If these two videos are grouped together with other videos that are directed to the concept of a cat chasing a mouse, the aggregate information (e.g., user response information) can be used to effectively evaluate the effectiveness of videos directed to the concept of a cat chasing a mouse, irrespective of differences in how those concepts are conveyed.

As discussed in detail below, the effectiveness of videos directed to each concept can be delineated on a per-user-group basis, such that insights about concepts that should be used in videos (or other content) can be generated based on the target audience and the effectiveness of different concepts when presented to the target audience. Furthermore, as discussed below, grouping and evaluating videos in this way can enable a computer system to more quickly learn optimal distribution parameters for new videos based on the insights determined for a group of pre-existing videos that belong to a same cluster (or video group) as the new video. The ability to more quickly learning optimal distribution parameters reduces the wasted resources that would otherwise be incurred by using traditional learning periods, which can take days or weeks, and also reduce the computing resources required for the computer to learn the distribution parameters.

The service apparatus 110 includes a concept evaluation apparatus ("CEA") 150 including one or more data processors. The CEA 150 is configured to cluster videos (and other content) based on conceptual similarity, and evaluate the resulting video groups (or other content groups) to determine the effectiveness of different video concepts. This evaluation can be used to surface insights regarding the use of certain concepts depending on the target audience (e.g., the group of users to whom the content will be directed). As discussed below, these insights can be visually communicated in a table format, a graph format, or another format. Furthermore, these insights can be used to recommend concepts for new videos, provide concept feedback on groups of existing videos, and initialize distribution rules for new videos based on the concepts to which those new videos are directed.

Figure 2:
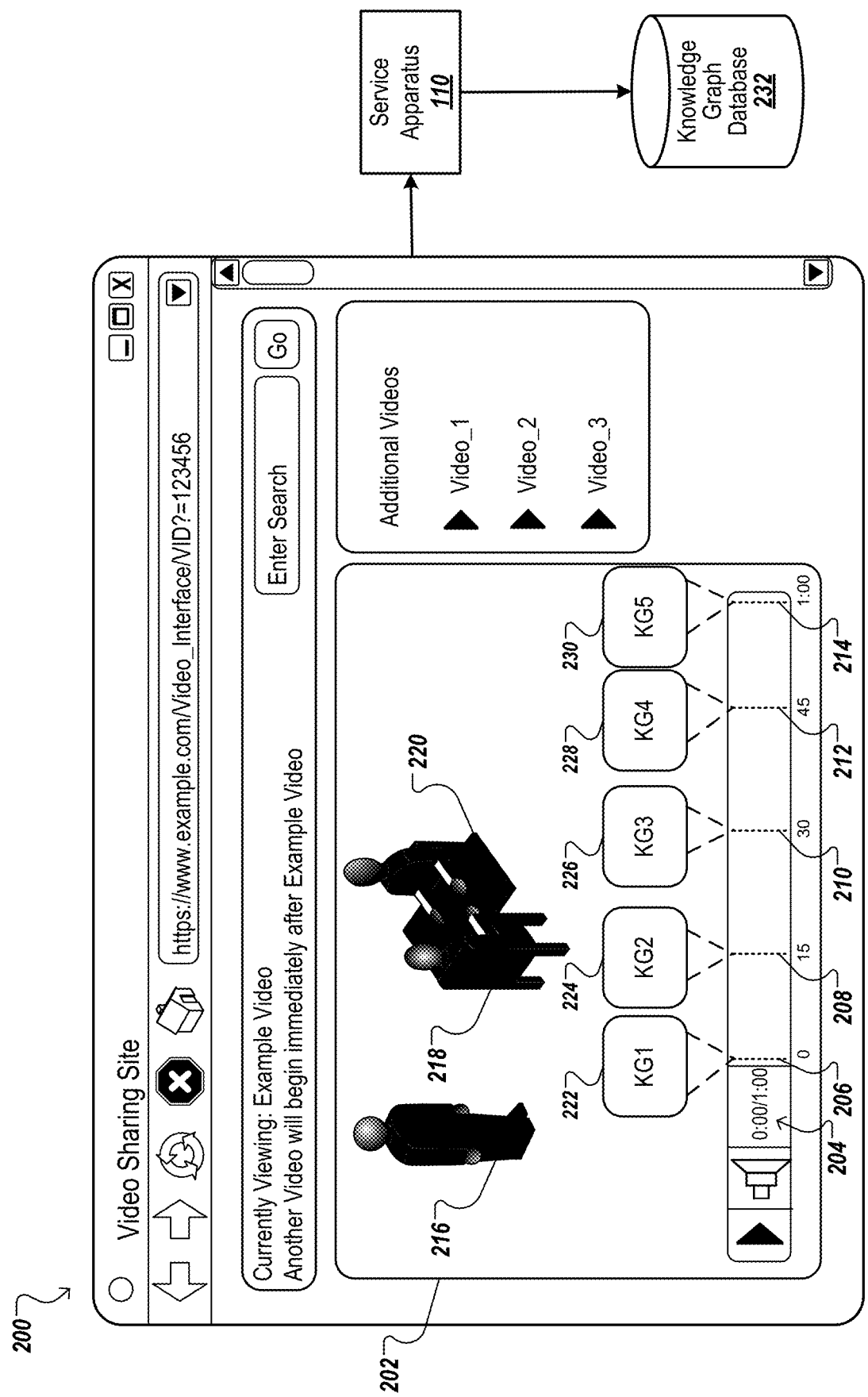
FIG. 2 is a block diagram illustrating concept extraction.

FIG. 2 is a block diagram 200 illustrating concept extraction from a video. The block diagram 200 includes a video player 202 in which videos are presented. The video player 202 is shown as part of a web page, but the video player 202 could be implemented in a native application (e.g., on a mobile or tablet device), or in another appropriate device, such as a streaming video player that plugs into a television, or is embedded in the television. Furthermore, the concept extraction discussed below can be performed independent of a video player 202, such that the video player 202 is included merely to aid in describing the concept extraction. Also, the concept extraction is discussed as being performed by the service apparatus 110, but the concept extraction could be performed on a portion of the service apparatus, such as the CEA 150, or another appropriate apparatus.

Videos available to be played by the video player 202 have a playback duration, which is also referred to as a length of the video. For example, a playback timer 204 in the video player 202 shows that the playback duration of the currently loaded video is one minute. To evaluate the context of a video, the service apparatus 110 (e.g., by way of the CEA 150) can determine the context of the video across the length of the video. For example, the service apparatus 110 can select different timestamps over the length of the video at which the context of the video is extracted. In the present example, the video is been segmented into 4 different segments ("quartiles") by the selection of timestamps at 0, 15, 30, 45, and 60 seconds, as identified by the reference numbers 206, 208, 210, 212, and 214, respectively. This quartile segmentation is being used to illustrate the concept of timestamp selection while preventing the figures from being cluttered. However, in practice, the service apparatus 110 can select timestamps as finely or coarsely as desired. In some implementations, the timestamps are selected at every second of the video duration, and in some implementations, the service apparatus 110 can select sub-second timestamps (e.g., ⅛th of a second).

Each of the selected timestamps is an indication of a portion of the video that will be evaluated to determine the concept being conveyed at that point in the video. In some implementations, the service apparatus 110 examines the video frame being presented at each timestamp to determine the context of the video at that timestamp. Returning to the previous example, the service apparatus 110 can evaluate the video at the beginning of the video (e.g., 0 seconds), at 15 seconds, at 30 seconds, at 45 seconds, and at the end of the video (e.g., at 1:00).

The evaluation of the video at each timestamp can include an identification of any objects presented by the video, attributes of those objects, and/or relationships between the objects presented by the video. For example, the video presented in the video player 202 includes a person 216, a chair 218, a table 220, and two additional people. In this example, the service apparatus 110 can use object detection techniques known in the art to identify these objects, their relative locations, and attributes such as colors, patterns, or other visual attributes.

Once the service apparatus 110 obtains the information about the objects depicted by the video at a given timestamp, the service apparatus 110 can generate a knowledge graph that represents concept conveyed by the video at that given timestamp. As used in this document, a knowledge graph is a representation of relationships between unique entities, and the knowledge graph can be stored in one or more data stores. Each node can represent a different unique entity, and nodes can be connected by graph edges (e.g., logical links) that represent relationships between the entities. The knowledge graph can be implemented, for example, in graphical form or in a data structure that includes data representing each node and data representing the relationships between each node.

Returning to the example above, the knowledge graph for the video depicted in the video player 202 could include separate nodes for the person 216, the chair 218, the table 220, and each of the two additional people. Each of these nodes can be connected by graph edges representing relationships between the entities. For example, the node representing the chair 218 could be linked to by the node representing person sitting in the chair by an edge labelled "sitting in" to represent the fact that the video depicts the person sitting in the chair 218. Similarly, the node representing the table 220 could also be linked to by the node representing the person sitting in the chair by an edge labelled "hands on" to represent the face that the person sitting in the chair 218 has their hands on the desk 220. Other attributes of the video can similarly be represented by the knowledge graph, such as colors, text, or other attributes. Of course, the edges between nodes need not include any labels, but rather can simply indicate some sort of relationship between the nodes.

For a given video, the service apparatus 110 can create multiple knowledge graphs. For example, the service apparatus 110 can create a different knowledge graph for each timestamp selected for a given video. In the example above, the service apparatus 110 would generate five different knowledge graphs 222, 224, 226, 228, and 230. The service apparatus 110 stores each of the knowledge graphs in a knowledge graph database 232 for further processing. For example, as discussed below, the service apparatus 110 can use the knowledge graphs to evaluate conceptual similarity between videos, and cluster videos based on conceptual similarity.

Figure 3:
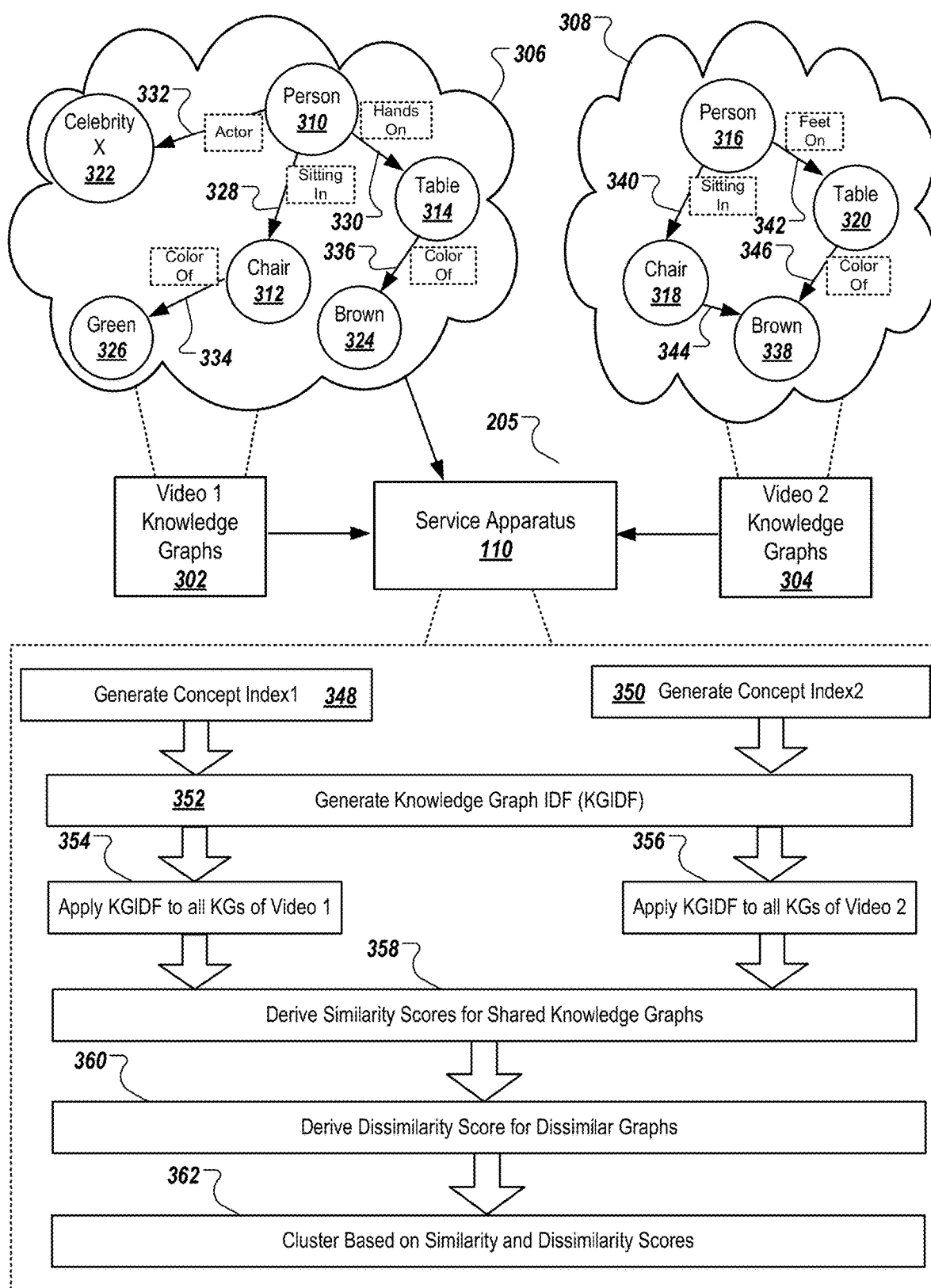
FIG. 3 is a block diagram illustrating video similarity between a pair of videos and video clustering by conceptual similarity.

FIG. 3 is a block diagram 300 illustrating video similarity between a pair of videos and video clustering by conceptual similarity. The block diagram 300 shows the service apparatus 110 receiving, as input, two sets of knowledge graphs for processing. More specifically, the service apparatus 110 is receiving video 1 knowledge graphs (V1KG) 302 and video 2 knowledge graphs (V2KG) 304. The V1KG 302 includes multiple knowledge graphs that were created based on the objects presented at different selected timestamps within video 1, and V2KG includes multiple knowledge graphs that were created based on the objects presented at different selected timestamps within video 2. The knowledge graph 306 is a visualization of an example knowledge graph that could be included in V1KG 302, and the knowledge graph 308 is a visualization of an example knowledge graph that could be included in V2KG 304. Each of the knowledge graphs 306 and 308 could represent a portion of a video that presents similar content as the frame of the video presented in the video player 202 of FIG. 2.

For example, the knowledge graph 306 includes a node 310 representing a person, a node 312 representing a chair, and a node 314 representing a table. These nodes 310, 312, and 314, could represent, for example, the chair 218, the desk 220, and the person sitting in the chair 218, as depicted by FIG. 2. Similarly, the knowledge graph 308 includes nodes 316, 318, and 320, which respectively represent a person, chair, and table. As discussed further below, the person, chair, and table represented by the nodes 316, 318, and 320 may be a different person, table, and chair than those depicted in the video player 202 of FIG. 2, or they could represent the same person, table, and chair.

The knowledge graph 306 also includes a node 322 representing "Celebrity X," a well-known actor, as well as nodes 324 and 326 that respectively represent the colors brown and green. The knowledge graphs also includes edges that connect the nodes, and specify a relationship type between the nodes. For example, the knowledge graph 306 includes an edge 328 between the nodes 310 and 312 indicating that there is a relationship between the person and the chair. In this example, the edge 328 has a label indicting the relationship of "Sitting In" with an arrow in the direction of the node 312 representing the chair. As such, this edge is indicating that the person and the chair are related by the fact that the person is sitting in the chair, as illustrated in FIG. 2. Similarly, the knowledge graph 206 includes an edge 330 linking the node 310 and 314 and having a label of "Hands On". Thus, the edge 330 represents the fact that the person has their hands on the table, as illustrated by FIG. 2. The knowledge graph 306 also includes an edge 332 between the node 301 and 322 indicating that the person represented by the node 310 is Celebrity X, who is an actor. The edge 334 is between the node 312 and the node 326 indicating that the chair is green, and the edge 336 is between the node 314 and the node 324 indicating that the table is brown.

Like the knowledge graph 306, the knowledge graph 308 also includes a node 338 representing the color brown. However, the knowledge graph 308 does not include nodes representing Celebrity X or the color green. The knowledge graph 308 also includes edges linking the nodes of the knowledge graph 308, and representing the relationships between the nodes. For example, the edge 340 linking nodes 316 and 318 represents the fact that the person is sitting in the chair, while the edge 342 linking nodes 316 and 320 indicates that the person has their feet on the desk. Furthermore, the edges 344 and 346 indicate that both of the table and the chair are brown in color.

The service apparatus 110 processes the sets of knowledge graphs (e.g., V1KG 302 and V2KG 304) to determine the conceptual similarity between videos and cluster the videos, for example, based on the similarities of the knowledge graphs in each of the sets.

As part of the processing, the service apparatus 110 generates concept index 1 for video 1 (348), and also generates concept index 2 for video 2 (350). The concept index for each video represents an importance of each concept depicted by each video. The concept index for a given video can be generated based on the concepts conveyed by objects depicted in the given video, and a level of prominence of each of the concepts over the length of the video. In some implementations, the concept index for a given video can be generated, for example, using the set of knowledge graphs obtained for that given video. For example, with reference to FIG. 3, the service apparatus 110 can generate the concept index 2 (350) using the set of knowledge graphs 304 for video 2.

More specifically, the service apparatus 110 can examine all of the knowledge graphs in the set 304 to identify, for each knowledge graph, a total presence share of the knowledge graph over the length of video 2. Because each knowledge graph represents a concept conveyed by the given video, the total presence share of a particular knowledge graph can represent the total presence share of a corresponding concept conveyed over the length of the video. In some implementations, the total presence share of a particular knowledge graph over the length of the video can be determined by aggregating the presence share of each knowledge graph at each timestamp of the video that is evaluated.

For example, assuming that five timestamps were selected, as discussed with reference to FIG. 2, the total presence share of a particular knowledge graph in this example could be the sum of the presence shares of that particular knowledge graph at each of the five timestamps (e.g., Total Presence Share=$\Sigma_{ts1}^{ts5}$ Presence Share, where ts represents the timestamp). The output obtained by summing the presence shares over the length of the video (e.g., at each of the selected timestamps) will generally be a numerical value that can be combined with other information to create a concept index, as discussed further below. With reference to FIG. 3, the service apparatus 110 can determine the total presence share of the knowledge graph 308 by summing the presence shares of the knowledge graph 308 for each of the timestamps evaluated within video 2.

The presence share for a particular knowledge graph can be based on a number of factors, such as the portion of the frame occupied by the objects represented by the knowledge graph, the locations of the objects in the frame, or other factors that correspond to the prominence of the objects in the frame. Generally speaking, the presence share of a knowledge graph representing an object is going to increase as the prominence of the object in the frame increases. For example, when the object is larger or occupies a larger portion of the frame, the presence share of the knowledge graph representing that object is going to increase. The presence share assigned to each knowledge graph at each timestamp can be a number between 0 (least prominence) and 1 (most prominence), although other appropriate scales (e.g., 0-10 or 0-100) can be used.

The service apparatus 110 can also determine the total number of timestamps at which each knowledge graph representing each concept is detected within a given video, as part of the concept index generation. In some implementations, the service apparatus 110 can determine the total number of timestamps of a video at which a particular knowledge graph is detected by searching the knowledge graphs obtained at each timestamp to determine whether the particular knowledge graph has been collected for that timestamp, and increment a counter for each instance of the particular knowledge graph that is detected at the timestamps. For example, if five timestamps were selected, as discussed with reference to FIG. 2, the service apparatus could search the knowledge graphs collected at each timestamp to determine whether any of the collected knowledge graphs matched a particular knowledge graph, and increment a counter for each timestamp having a knowledge graph matching the particular knowledge graph. The value of the counter after all timestamps for a given video have been searched represents the total number of timestamps (also referred to as the number of portions) of the given video that are described by the particular knowledge graph.

The service apparatus 110 can combine, for a given video, the total presence share for a particular knowledge graph over the length of the given video and the total number of timestamps of the given video at which the particular knowledge graph was detected to arrive at a concept value corresponding to the level of prominence of a concept represented by the particular knowledge graph over the length of the given video. In some implementations, the concept value can be computed by taking a ratio of the summed presence shares for a particular knowledge graph representing the concept and the total number of timestamps of the given video at which the particular knowledge graph was detected. The generalized ratio can take the form expressed in relationship (1).

$$\text{Concept Value}_{KGi} = \frac{\text{Summed Presence Shares}_{KGi}}{\text{Total Instances}_{KGi}} \quad (1)$$

where,
Concept Value KGi is the concept value for a concept represented by the $i^{th}$ knowledge graph;
Summed Presence SharesKGi is the summed presence shares of the $i^{th}$ knowledge graph over a given video;
Total Instances KGi is the total number of timestamps (or portions) of the given video at which the $i^{th}$ knowledge graph is detected.

In some implementations, each concept value generated for a given video can be considered a concept index. In some implementations, the concept index for a given video includes concept values for each of multiple different concepts conveyed by the video and represented by different knowledge graphs. For example, when the concept index for a video includes multiple different concept values for different concepts, each value of the concept index can correspond to a different concept and knowledge graph representing that concept.

The service apparatus 110 generates a knowledge graph inverse document frequency ("KGIDF") measure based on the occurrences of different knowledge graphs across all (or a subset) of the videos to be clustered (352). The KGIDF can be used to adjust the inverse document frequency of the individual knowledge graphs in each video. The KGIDF for all of the videos can be generated, for example, using relationship (2).

$$idf_{KGi} = \log \frac{\# \text{ of videos}}{|\{v \in \# \text{ of videos}: KGi \in v\}|} \quad (2)$$

where, $|\{v \in \# \text{ of videos:kgi} \in v\}|$ is the number of videos in which KGi, and KGi is the $i^{th}$ knowledge graph.

The service apparatus 110 applies the KGIDF to the set of knowledge graphs 302 for video 1 (354) and also applies the set of knowledge graphs 304 for video 2 (356). The application of the KGIDF to a set of knowledge graphs results in an adjusted inverse document frequency for each of knowledge graphs. The adjusted KGIDF prevents errors that occur when two videos have very few knowledge graphs in common. For example, assume that two videos only share one common attribute (e.g., the color purple), but the common attribute is very similar (e.g., has small similarity distance). In this situation, some similarity techniques will result in a very high similarity despite the fact that the videos may otherwise be very dissimilar. In other words, the similarity of the common attribute using some similarity techniques (e.g., similarity=1/sqrt (distance)), may cause the similarity of the one attribute to outweigh the dissimilarities, resulting in erroneous similarity determinations.

In some implementations, the KGIDF is applied to the set of knowledge graphs according to relationship (3).

$$adj\ value_{(videoj|KGi)} := value_{(videoj|KGi)} * idf_{KGi} \quad (3)$$

where:
    adj value$_{(videoj|KGi)}$ is the adjusted value of the $i^{th}$ knowledge graph in the $j^{th}$ video;
    valve$_{(videoj|KGi)}$ is the summed presence shares of the $i^{th}$ knowledge graph over the length of the $j^{th}$ video; and
    idf$_{KGi}$ is the KGIDF for the $i^{th}$ knowledge graph.

For example, the service apparatus 110 can generate the adjusted value of the knowledge graph 308, which can also be referred to as an adjusted presence share, by multiplying the total presence share of the knowledge graph 308 in video 2 by the KGIDF for the knowledge graph 308 across all of the videos being analyzed by the service apparatus 110.

The service apparatus 110 derives (e.g., determines or computes) similarity scores for shared knowledge graphs between a pair of videos (358). With reference to FIG. 3, the service apparatus 110 can determine the similarity scores for the video pair including video 1 and video 2 using the set of knowledge graphs 302 and the set of knowledge graphs 304. For example, the service apparatus 110 can derive shared similarity scores for the pair of videos and a possible similarity scores for the pair of videos. In some implementations, a separate shared similarity score is derived for each knowledge graph that is detected in both of the videos in the pair (e.g., video 1 AND video 2). Similarly, the service apparatus can derive a separate possible similarity score for each of the knowledge graphs detected in both videos in the pair.

The shared similarity score refers to a similarity score that is based on a minimum amount of concept prominence among the pair of videos. For example, the shared similarity score can represent the minimum total presence share of a particular knowledge graph in either of the videos in the pair. In other words, the service apparatus 110 can determine which of the videos in the pair (e.g., video 1 or video 2) has the lower adjusted value for a particular knowledge graph, as determined, for example, using relationship (3), and select the lower adjusted value for that particular knowledge graph as the shared similarity score for the pair of videos. This determination can be performed, for example, using relationship (4).

$$SS\_KGi_{(video1video2)} = \min(adj\ value_{(video1|KGi)}, adj\ value_{(video2|KGi)}) \quad (4)$$

where:
    SS_KGi$_{(video\ 1, video\ 2)}$ is the shared similarity between video 1 and video 2 for the $i^{th}$ knowledge graph;
    adj value$_{(video1|KGi)}$ is the adjusted value (see relationship 3) for the $i^{th}$ knowledge graph in video 1; and
    adj value$_{(video2|KGi)}$ is the adjusted value (see relationship 3) for the $i^{th}$ knowledge graph in video 2.

The possible similarity score refers to a similarity score that is based on a maximum amount of concept prominence among the pair of videos. For example, the possible similarity score can represent the maximum total presence share of a particular knowledge graph in either of the videos in the pair. In other words, the service apparatus 110 can determine which of the videos in the pair (e.g., video 1 or video 2) has the higher adjusted value for a particular knowledge graph, as determined, for example, using relationship (3), and select the higher adjusted value for that particular knowledge graph as the possible similarity score for the pair of videos. This determination can be performed, for example, using relationship (5).

$$PS\_KGi_{(video1video2)} = \max(adj\ value_{(video1|KGi)}, adj\ value_{(video2|KGi)}) \quad (5)$$

where:
    PS_KGi$_{(video\ 1, video\ 2)}$ is the possible similarity between video 1 and video 2 for the $i^{th}$ knowledge graph;
    adj value$_{(video1|KGi)}$ is the adjusted value (see relationship 3) for the $i^{th}$ knowledge graph in video 1; and
    adj value$_{(video2|KGi)}$ is the adjusted value (see relationship 3) for the $i^{th}$ knowledge graph in video 2.

The service apparatus 110 derives (e.g., determines or computes) dissimilarity scores for dissimilar knowledge graphs in each video among the pair of videos (358). With reference to FIG. 3, the service apparatus 110 can determine the dissimilarity scores for the video pair including video 1 and video 2 using the set of knowledge graphs 302 and the set of knowledge graphs 304. In some implementations, the service apparatus 110 can generate a dissimilarity score for the pair of videos by summing the concept values for the dissimilar knowledge graphs in each of the videos of the pair. For example, the service apparatus 110 can identify knowledge graphs of video 1 that are not included in video 2, and the knowledge graphs of video 2 that are not in video 1. In this example, the service apparatus can sum the concept indices for the dissimilar knowledge graphs of video 1 and video 2, and output that sum as the dissimilarity score for the pair of videos that includes video 1 and video 2.

Another dissimilarity measure that can be determined by the service apparatus 110 is a total number of dissimilar knowledge graphs in each video among the pair of videos, which is referred to as a dissimilarity count. This can be determined by incrementing a counter each time that the service apparatus 110 does not find a match between a knowledge graph identified for one of the videos of the pair is not found in the other video in the pair.

The service apparatus clusters videos based on the similarity and dissimilarity scores (362). The clustering creates multiple groups of videos that each contain videos having at least a specified level of similarity. For example, one group that is created by the clustering will include multiple videos that each have a specified level of similarity to one or more other videos in the group. The specifics as to how the similarity and dissimilarity measures are used to create the groups is discussed in more detail with reference to FIG. 4.

Figure 4:
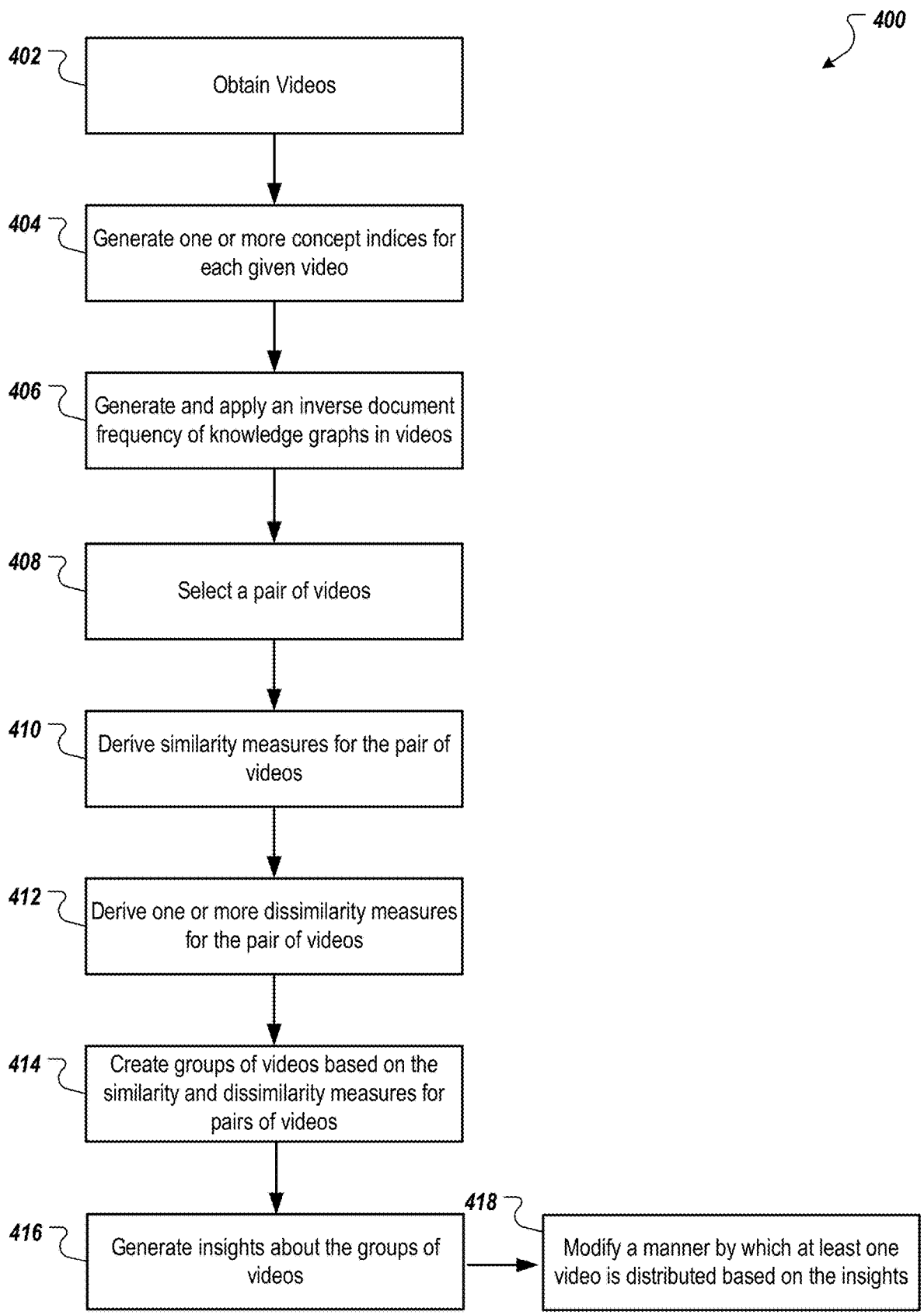
FIG. 4 is a flow chart of an example process for using video similarity to provide insights about groups of videos and modify the manner in which videos are distributed.

FIG. 4 is a flow chart of an example process 400 for using video similarity to provide insights about groups of videos and modify the manner in which videos are distributed. Operations of the process 400 can be implemented, for example, by the service apparatus 110 (and/or CEA 150) of FIG. 1. Operations of the process 400 can also be implemented using instructions encoded on one or more computer readable medium, which can be non-transitory. When the instructions are executed by one or more data processing apparatus (e.g., one or more computing devices), the instructions cause the one or more data processing apparatus to perform operations of the process 400.

Videos are obtained by a service apparatus (402). In some implementations, the obtained videos are obtained when the videos are uploaded by video publishers. The video publishers can be users who upload videos to a video sharing site, or entities who create videos for presentation with other content. For example, the obtained videos could be in the form of digital components provided for distribution with other content, as discussed with reference to FIG. 1.

One or more concept indices are generated for each given video that was obtained (404). The one or more concept indices can include a separate concept index that is generated for each given knowledge graph that is obtained for a given video. In some implementations, the concept index for a given video is generated based on at least (i) a concept conveyed by one or more objects depicted in the given video, and (ii) a level of prominence of the concept in the given video. As discussed above with reference to FIG. 3, one or more concepts conveyed by one or more objects depicted in the given video can be represented by one or more knowledge graphs that are obtained for multiple portions of the given video (e.g., at multiple different timestamps). The one or more knowledge graphs can be obtained, for example, through evaluation of the video and/or from a database storing previously generated knowledge graphs, as discussed with reference to FIG. 2.

In some implementations, a concept index can be generated by evaluating the presence of a knowledge graph in a video. For example, a particular concept index can be generated for a concept represented by a particular knowledge graph based on the number of times the knowledge graph is detected in the video and the total presence share of the knowledge graph over the length of the video, as discussed in detail with reference to FIG. 3. More specifically, the concept index for a particular knowledge graph can be determined as a ratio of (i) the total presence share for the particular knowledge graph over the length of the video and (ii) the total number of instances of the particular knowledge graph in the given video.

As discussed above, a presence share at a given timestamp within a video is indicative of the level of prominence of the one or more concepts represented by a given knowledge graph at that timestamp of the video the video, which is also indicative of the level of prominence of the one or more concepts conveyed by the video. In some implementations, the total presence share for a given knowledge graph (and corresponding concept(s)) is determined by summing the presence shares of the given knowledge graph over the length of the video. Meanwhile, the number of portions of the video that are described by the given knowledge graph can be determined based on the number of timestamps (or portions) of the video at which the particular knowledge graph is detected.

An inverse document frequency is generated for each given knowledge graph and applied (406). The inverse document frequency for a given knowledge graph is generated, for example, by determining the frequency of the given knowledge graph among all knowledge graphs obtained from the videos being evaluated. In some implementations, the inverse document frequency for a given knowledge graph can be generated based on a total number of the multiple videos that are represented by the given knowledge graph. In other words, the inverse document frequency for the given knowledge graph can be based on how many of the videos have a set of knowledge graphs that includes the given knowledge graph. In some implementations, the inverse document frequency for a given knowledge graph can be determined using relationship (2), discussed with reference to FIG. 3.

The inverse document frequency for a given knowledge graph can be applied to a, for example, by multiplying the inverse document frequency with the total presence share of the given knowledge graph in a particular video. For example, relationship (3), which is discussed with reference to FIG. 3, can be used to apply the inverse document frequency. In some implementations, a separate inverse document frequency is generated for each different knowledge graph, and the total presence share for each given knowledge graph in each video can be adjusted using the inverse document frequency generated for the given knowledge graph. In other words, the generated inverse document frequency is applied to the total presence share of the given knowledge graph for each of multiple videos having timestamps represented by the given knowledge graph.

A pair of videos is selected from among the multiple obtained videos (408). In some implementations, the pair of videos can be randomly (or pseudorandomly) selected.

Similarity measures are derived for the pair of videos (410). In some implementations, the derivation of the similarity measures includes deriving a shared similarity score for shared knowledge graphs between the pair of videos, and deriving a possible similarity score for the shared knowledge graphs. The similarity scores can be generated for each particular shared knowledge graph between the pair of videos. In some implementations, a shared knowledge graph is a knowledge graph that is found in each video among the pair of videos. For example, a particular knowledge graph identified for video 1 can be considered a shared knowledge graph if a matching knowledge graph is also identified for video 2. Note that a matching knowledge graph may be an exact match, but does not necessarily need to be an exact match. In other words, matching knowledge graphs can be knowledge graphs that have one or more of the same nodes representing one or more objects. The level of match required to deem two knowledge graphs as matching can vary depending on the application.

The shared similarity score can be derived based on a minimum presence share of the shared knowledge graph in either video among the pair of videos. For example, as discussed above with reference to FIG. 3, the shared similarity score for a particular shared knowledge graph can be the minimum adjusted presence share (e.g., adjusted value) for the particular shared knowledge graph in either of the videos of the pair, as shown in relationship (4).

The possible similarity score can be derived based on a maximum presence share of the shared knowledge graph in either video among the pair of videos. For example, as discussed above with reference to FIG. 3, the possible similarity score for a particular shared knowledge graph can be the maximum adjusted presence share (e.g., adjusted value) for the particular shared knowledge graph in either of the videos of the pair, as shown in relationship (5).

The derivation of similarity measures can also include the generation of a count of shared knowledge graphs between the pair of videos. Each shared knowledge graph is a given knowledge graph that is among the knowledge graphs the represent each video in the pair of videos. As discussed above, the shared knowledge graphs can be identified by finding, in one of the videos, a matching knowledge graph for a given knowledge graph that has been identified for the other video in the pair. The count of shared knowledge graphs can be generated, for example, by incrementing a counter (or otherwise counting) each time a given knowledge graph for one video in the pair is deemed to match a knowledge graph in the other video. In some situations, the counter can be incremented only once for all matches of a given knowledge graph. In other situations, the counter can be incremented for every instance of a match between a given knowledge graph in one video with multiple instances of a matching knowledge graph in the other video.

One or more dissimilarity measures are derived for the pair of videos (412). In some implementations, the derivation of dissimilarity measures includes the generation of a dissimilarity count, and the calculation of a dissimilarity score. The dissimilarity measures can be derived, for example, using dissimilar knowledge graphs from each of the videos in the pair. For example, while the similarity measures discussed above were generated using the matching knowledge graphs for the pair of videos, the dissimilarity measures are generated using those knowledge graphs from each video for which a matching knowledge graph was not found in the other video of the pair. As can be appreciated, irrespective of the conditions used for determining a match there will be a set of matching knowledge graphs that are used to derive the similarity measures, and a set of dissimilar knowledge graphs (or unmatched knowledge graphs) that will be used to determine the dissimilarity measures.

The generation of the dissimilarity count can be generated based on a number of the dissimilar knowledge graphs that are identified for the pair of videos. The number of dissimilar knowledge graphs can be, for example, the total number of knowledge graphs for both videos for which a matching knowledge graph was not identified in the other video of the pair. The number of dissimilar knowledge graphs can be generated, for example, by incrementing a counter each time that a match for a knowledge graph in one video is not found in the other video, and the number of dissimilar knowledge graphs can be the value of the counter after all knowledge graphs of the two videos have been analyzed to find matches. In other words, the dissimilarity count can be a number of the dissimilar knowledge graphs that represent only one of the videos in the pair of videos.

The dissimilarity score for the pair of videos can be calculated based on the concept indices of the dissimilar knowledge graphs of each video in the pair of videos. For example, the concept index can be identified for each dissimilar knowledge graph for each video in the pair. These concept indices for each of the dissimilar knowledge graphs can then be summed to obtain the dissimilarity score for the two videos in the pair.

Multiple groups of videos are created based on the similarity measures and the dissimilarity measures (414). In some implementations, each given group of videos will be created to include only those videos that have at least a specified level of similarity to other videos in the given group. For example, to be included in a given group, a given video can be required to satisfy a set of similarity conditions with respect to each other video in the group. The set of similarity conditions can relate to the similarity and dissimilarity measures discussed above, and can be used to ensure that all of the video are conceptually related to a similar concept.

The creation of the groups can be based, for example, on the concept indices (either directly or indirectly) of the videos. For example, the dissimilarity measures are derived based directly on the concept indices of the dissimilar knowledge graphs, while the similarity measures are derived based on the presence shares, which are also used to determine the concept indices.

In some implementations, the creation of the groups can rely on one or more of the following factors:

1) A number of shared knowledge graphs, represented by n_similar, which refers to the number of matching knowledge graphs between a pair of graphs.
2) A number of dissimilar knowledge graphs, represented by m_dissimilar, which refers to the number of knowledge graphs in each video of the pair that does not have a match in the other video of the pair.
3) A sum of possible similarity, represented by total_possible_similarity, which refers to the mathematical sum of the possible similarity measures for all shared knowledge graphs for the pair of videos.
4) A sum of shared similarity, represented by shared_similarity_mass, which refers to the mathematical sum of the shared similarity measures for all shared knowledge graphs for the pair.
5) A sum of dissimilarity scores, represented by, dissimilarity mass, which is a sum of the dissimilarity scores for all dissimilar knowledge graphs for the pair of videos.
6) A dissimilarity share, represented by dissimilarity_share, where dissimilarity_share=dissimilarity_mass/shared_similarity_mass.
7) A total mass, represented by total mass, where total_mass=dissimilarity_mass+total_possible_similarity.
8) A share of dissimilarity, represented by share_of_dissimilarity, where share_of_dissimilarity=dissimilarity_share/total_mass.
9) A share of realized similarity, represented by share_of_realized_similiarity, where share_of_realized_similiarity=shared_similarity_mass/total_mass.
10) A share of possible similarity, represented by share_of_possible_similarity, where share_of_possible_similarity=total_possible_similarity/total_mass
11) A comparison score, represented by comparison_score, where comparison_score=shared_similarity mass/dissimilarity_mass.
12) A creative approach similarity score, represented by creative_approach_similarity_score, where creative_approach_similarity_score=total_possible_similarity/dissimilarity_mass.

In some implementations, one or more of these factors is used to describe the relationship (e.g., similarity) between each pair of videos being evaluated, such that each pair of videos among the obtained videos is characterized by these factors. The factors used to describe the relationship between the pairs of videos can be input to a clustering algorithm, which groups the videos together based on these factors.

In some implementations, the groups of videos can be visually presented in a graphical user interface. To reduce the clutter of the graphical user interface, and to improve processing time, the groups of videos can be deduplicated to remove videos that are the same from the representation. The deduplication process can identify, for example, those pairs of video within a given group that have more than a threshold shared similarity and/or less than a specified level of dissimilarity, which would be an indication that the videos are substantially the same.

Insights are generated about the multiple video groups (416). In some implementations, the insights for each given video group is determined based on data obtained through a feedback loop. For example, user reactions to presented videos can be obtained through the feedback loop, and logged with a reference to the videos that were presented and/or the groups that contain the videos. The reactions can be aggregated on a per-group basis, which can be used to provide insights about the groups of videos, the concepts conveyed by the groups of videos, and other attributes of the groups of videos.

The feedback loop can be implemented, for example as a script that is launched when a user interacts with a video (e.g., clicks a video), pings that are automatically generated during playback of a video to report watch times, or using other mechanisms. Using these feedback loops, the user is not required to separately report their reactions about videos presented to the users. Rather, the reactions (e.g., positive or negative) can be inferred based on the data collected using the various feedback loops.

The insights generated based on the aggregated data for the multiple different video groups can include, for example, identification of groups of videos that obtain higher levels of positive feedback data relative to other groups of videos that obtain lower levels of positive feedback data. Once the groups having higher levels of positive feedback data are identified, a video publisher can be provided with information about the types of videos that receive the higher levels of positive feedback data so that they can incorporate similar features in new videos. Similarly, a video publisher can be provided information about the groups of videos receiving lower levels of positive feedback data so that the video publisher can omit similar features from new videos.

In some implementations, the insights can be created on a per-audience-type basis. For example, the feedback data can be segmented based on any type of audience characteristic (e.g., device type, interest groups, time of day, geographic region, etc.), and the insights can be generated for each of the audience types or audience segments. When the data is segmented in this manner, the insights (e.g., as discussed above) can be provided to the video publisher based on the type of audience for whom the video publisher is creating videos.

The insights that are generated can extend beyond insights used by video publisher to create videos that will receive higher levels of positive feedback. In some implementations, the insights can be used to substantially reduce the amount of time required to train a computer to efficiently and effectively distribute a new video that is uploaded. For example, when a new video is uploaded, it can be evaluated and clustered as discussed throughout this document. Once the new video has been assigned to a cluster, the insights for the videos in that cluster can be used to generate the initial distribution criteria for the new video based on the known similarities of the new video to the other videos in the cluster. By generating the initial distribution criteria in this manner and distributing the new video using the initial distribution criteria generated based on the insights of the other videos in the cluster, the training period required by existing systems (which can be more than a week long) is substantially reduced or eliminated, such that the computer system can much more quickly tweak the distribution criteria of the new video to arrive at an optimal set of distribution criteria.

A manner by which at least one video is distributed is modified based on the insights (418). In some implementations, the modification of the manner by which the at least one video is distributed can include adjusting distribution criteria for the video. For example, assume that the initial intended audience of a given video in a cluster is for football fans in Atlanta, GA, but that the group of videos in which the given video is included has low feedback data for that group, but high feedback data for hockey fans in Atlanta, GA. In this example, the distribution criteria for the given video can be adjusted to increase the likelihood that the given video is presented to an audience of hockey fans in Atlanta, GA. In another example, the times at which videos are distributed or the content with which the videos are distributed can be adjusted based on the insights generated for each of the groups. Furthermore, attributes of the videos themselves can be modified to improve the likelihood that the feedback data received are more positive.

Figure 5:
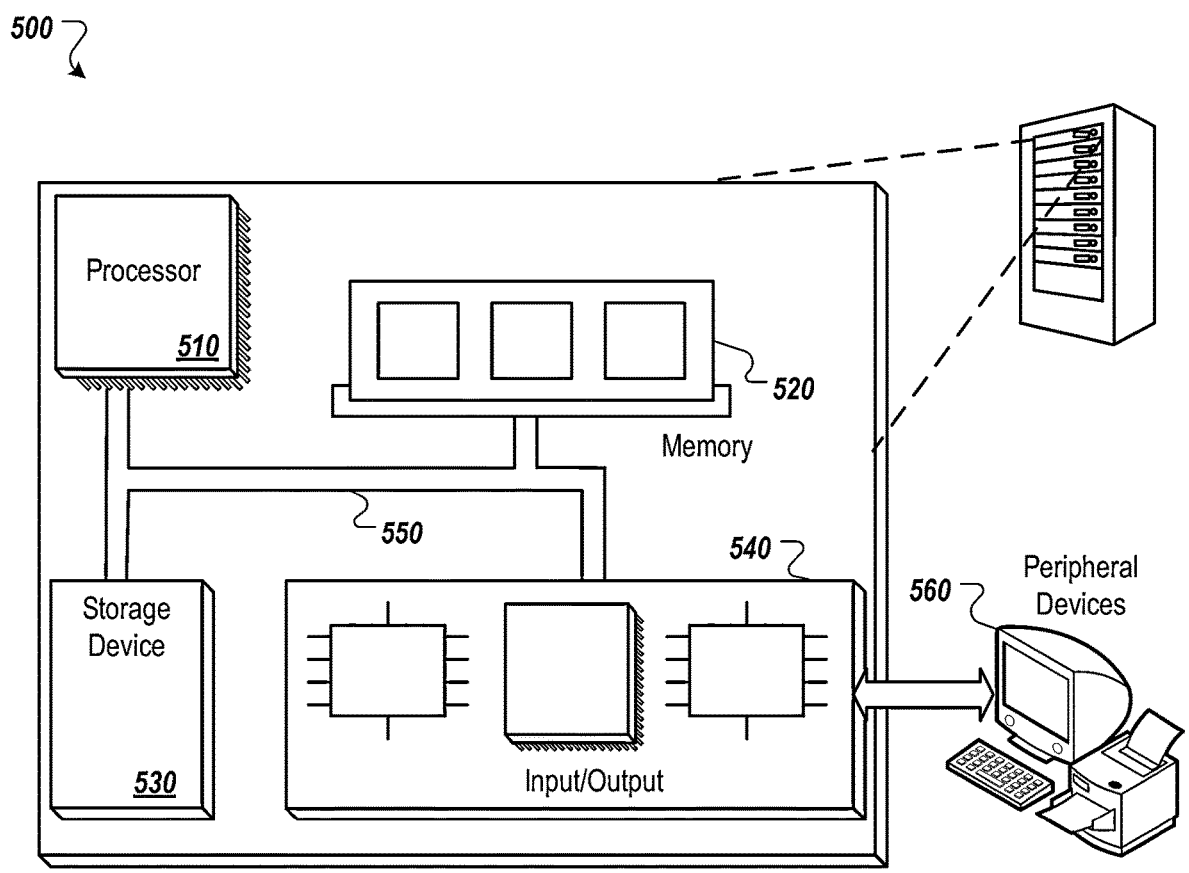
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 400. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This document refers to a service apparatus 110. As used herein, a service apparatus 110 is one or more data processing apparatus that perform operations to facilitate the distribution of content over a network. The service apparatus 110 is depicted as a single block in block diagrams. However, while the service apparatus 110 could be a single device or single set of devices, this disclosure contemplates that the service apparatus 110 could also be a group of devices, or even multiple different systems that communicate in order to provide various content to client devices 106. For example, the service apparatus 110 could encompass one or more of a search system, a video streaming service, an audio streaming service, an email service, a navigation service, an advertising service, or any other service.

An electronic document (which for brevity will simply be referred to as a document) may, but need not, correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    obtaining, by a service apparatus, videos uploaded by video publishers;
    generating, by the service apparatus, a concept index for each given video, wherein the concept index is generated based on at least (i) a concept conveyed by one or more objects depicted in the video, and (ii) a level of prominence of the concept in the given video;
    creating, by the service apparatus and based on the concept indices of the videos, multiple video groups, wherein each given video group among the multiple video groups is created to include two or more different videos that each have a specified level of similarity to other videos in the given video group;
    generating, by the service apparatus and based on data obtained through a feedback loop, insights about the multiple video groups; and
    modifying, by the service apparatus, a manner by which at least one video is distributed over a network based on the insights about the given video group that includes the at least one video.

2. The method of claim 1, wherein generating the concept index for each given video comprises:
    for each given video among the videos:
        obtaining one or more knowledge graphs for multiple portions of the given video, wherein each of the knowledge graphs represents one or more concepts conveyed by the given video; and
        determining, for each given knowledge graph, a presence share indicative of the level of prominence of the concept represented by the given knowledge graph, wherein the concept index is generated, at least in part, based on a number of instances of the given knowledge graph in the given video and a total presence share of the given knowledge graph over a length of the video.

3. The method of claim 2, wherein generating the concept index for each given video comprises:
    for each given knowledge graph obtained for the given video:
        summing the presence shares of the given knowledge graph over the length of the given video;
        determining a number of portions of the given video are described by the given knowledge graph; and
        generating the concept index for the given video based on a ratio of the summed presence shares relative to the number of portions.

4. The method of claim 3, further comprising:
    for each given knowledge graph obtained for multiple videos uploaded by the video publishers:
        generating an inverse document frequency measure for the given knowledge graph based on a total number of the multiple videos that are represented by the given knowledge graph; and
        applying the generated inverse document frequency to a total presence share of the given knowledge graph for each of the multiple videos.

5. The method of claim 4, further comprising:
    selecting a pair of videos from among the multiple videos;
    generating a count of shared knowledge graphs between the pair of videos, wherein each shared knowledge graph is a given knowledge graph that is among the knowledge graphs that represent each video in the pair of videos;

for each particular shared knowledge graph between the pair of videos:

deriving a shared similarity score of the particular shared knowledge graph based on a minimum presence share of the knowledge graph for either video among the pair of videos; and deriving a possible similarity score of the particular shared knowledge graph based on a maximum presence share of the knowledge graph for either video among the pair of videos.

6. The method of claim 5, further comprising:

generating a dissimilarity count based on a number of dissimilar knowledge graphs that represent only one of the videos in the pair of videos;

calculating a dissimilarity score for the pair of videos based on the concept indices of the dissimilar knowledge graphs of each video in the pair of videos; and generating one or more clustering factors for the pair of videos based on the dissimilarity score, the possible similarity score, and the shared similarity score.

7. The method of claim 6, wherein creating the multiple groups of videos comprises:

for each pair of videos, comparing the clustering factors for the pair of videos to the specified level of similarity;

including, in a same group, a first pair of videos for which the clustering factors meet the specified level; and excluding, from the same group a third video for which the clustering factors relative to the first pair of videos does not meet the specified level.

8. A system comprising:

a memory device; and one or more processors configured to interact with the memory device and execute instructions that cause the one or more processors to perform operations comprising:

obtaining videos uploaded by video publishers;

generating a concept index for each given video, wherein the concept index is generated based on at least (i) a concept conveyed by one or more objects depicted in the video, and (ii) a level of prominence of the concept in the given video;

creating, based on the concept indices of the videos, multiple video groups, wherein each given video group among the multiple video groups is created to include two or more different videos that each have a specified level of similarity to other videos in the given video group;

generating, based on data obtained through a feedback loop, insights about the multiple video groups; and modifying a manner by which at least one video is distributed over a network based on the insights about the given video group that includes the at least one video.

9. The system of claim 8, wherein generating the concept index for each given video comprises:

for each given video among the videos:

obtaining one or more knowledge graphs for multiple portions of the given video, wherein each of the knowledge graphs represents one or more concepts conveyed by the given video; and determining, for each given knowledge graph, a presence share indicative of the level of prominence of the concept represented by the given knowledge graph, wherein the concept index is generated, at least in part, based on a number of instances of the given knowledge graph in the given video and a total presence share of the given knowledge graph over a length of the video.

10. The system of claim 9, wherein generating the concept index for each given video comprises:

for each given knowledge graph obtained for the given video:

summing the presence shares of the given knowledge graph over the length of the given video;

determining a number of portions of the given video are described by the given knowledge graph; and generating the concept index for the given video based on a ratio of the summed presence shares relative to the number of portions.

11. The system of claim 10, wherein the instructions cause the one or more processors to perform operations further comprising:

for each given knowledge graph obtained for multiple videos uploaded by the video publishers:

generating an inverse document frequency measure for the given knowledge graph based on a total number of the multiple videos that are represented by the given knowledge graph; and applying the generated inverse document frequency to a total presence share of the given knowledge graph for each of the multiple videos.

12. The system of claim 11, wherein the instructions cause the one or more processors to perform operations further comprising:

selecting a pair of videos from among the multiple videos;

generating a count of shared knowledge graphs between the pair of videos, wherein each shared knowledge graph is a given knowledge graph that is among the knowledge graphs that represent each video in the pair of videos;

for each particular shared knowledge graph between the pair of videos:

deriving a shared similarity score of the particular shared knowledge graph based on a minimum presence share of the knowledge graph for either video among the pair of videos; and deriving a possible similarity score of the particular shared knowledge graph based on a maximum presence share of the knowledge graph for either video among the pair of videos.

13. The system of claim 12, wherein the instructions cause the one or more processors to perform operations further comprising:

generating a dissimilarity count based on a number of dissimilar knowledge graphs that represent only one of the videos in the pair of videos;

calculating a dissimilarity score for the pair of videos based on the concept indices of the dissimilar knowledge graphs of each video in the pair of videos; and generating one or more clustering factors for the pair of videos based on the dissimilarity score, the possible similarity score, and the shared similarity score.

14. The system of claim 13, wherein creating the multiple groups of videos comprises:

for each pair of videos, comparing the clustering factors for the pair of videos to the specified level of similarity;

including, in a same group, a first pair of videos for which the clustering factors meet the specified level; and excluding, from the same group a third video for which the clustering factors relative to the first pair of videos does not meet the specified level.

15. One or more non-transitory computer readable medium storing instructions, that upon execution by one or more data processing apparatus, cause the one or more data processing apparatus to perform operations comprising:
- obtaining videos uploaded by video publishers;
- generating a concept index for each given video, wherein the concept index is generated based on at least (i) a concept conveyed by one or more objects depicted in the video, and (ii) a level of prominence of the concept in the given video;
- creating, based on the concept indices of the videos, multiple video groups, wherein each given video group among the multiple video groups is created to include two or more different videos that each have a specified level of similarity to other videos in the given video group;
- generating, based on data obtained through a feedback loop, insights about the multiple video groups; and
- modifying a manner by which at least one video is distributed over a network based on the insights about the given video group that includes the at least one video.

16. The non-transitory computer readable medium of claim 15, wherein generating the concept index for each given video comprises:
- for each given video among the videos:
  - obtaining one or more knowledge graphs for multiple portions of the given video, wherein each of the knowledge graphs represents one or more concepts conveyed by the given video; and
  - determining, for each given knowledge graph, a presence share indicative of the level of prominence of the concept represented by the given knowledge graph, wherein the concept index is generated, at least in part, based on a number of instances of the given knowledge graph in the given video and a total presence share of the given knowledge graph over a length of the video.

17. The non-transitory computer readable medium of claim 16, wherein generating the concept index for each given video comprises:
- for each given knowledge graph obtained for the given video:
  - summing the presence shares of the given knowledge graph over the length of the given video;
  - determining a number of portions of the given video are described by the given knowledge graph; and
  - generating the concept index for the given video based on a ratio of the summed presence shares relative to the number of portions.

18. The non-transitory computer readable medium of claim 17, wherein the instructions cause the one or more data processing apparatus to perform operations further comprising:
- for each given knowledge graph obtained for multiple videos uploaded by the video publishers:
  - generating an inverse document frequency measure for the given knowledge graph based on a total number of the multiple videos that are represented by the given knowledge graph; and
  - applying the generated inverse document frequency to a total presence share of the given knowledge graph for each of the multiple videos.

19. The non-transitory computer readable medium of claim 18, wherein the instructions cause the one or more data processing apparatus to perform operations further comprising:
- selecting a pair of videos from among the multiple videos;
- generating a count of shared knowledge graphs between the pair of videos, wherein each shared knowledge graph is a given knowledge graph that is among the knowledge graphs that represent each video in the pair of videos;
- for each particular shared knowledge graph between the pair of videos:
  - deriving a shared similarity score of the particular shared knowledge graph based on a minimum presence share of the knowledge graph for either video among the pair of videos; and
  - deriving a possible similarity score of the particular shared knowledge graph based on a maximum presence share of the knowledge graph for either video among the pair of videos.

20. The non-transitory computer readable medium of claim 19, wherein the instructions cause the one or more data processing apparatus to perform operations further comprising:
- generating a dissimilarity count based on a number of dissimilar knowledge graphs that represent only one of the videos in the pair of videos;
- calculating a dissimilarity score for the pair of videos based on the concept indices of the dissimilar knowledge graphs of each video in the pair of videos; and
- generating one or more clustering factors for the pair of videos based on the dissimilarity score, the possible similarity score, and the shared similarity score.

* * * * *